(12) United States Patent
Gritsay et al.

(10) Patent No.: US 7,606,813 B1
(45) Date of Patent: Oct. 20, 2009

(54) MODEL CONSOLIDATION IN A DATABASE SCHEMA

(75) Inventors: Dmitry Gritsay, Boxborough, MA (US); Vitaly Rozenman, Shrewsbury, MA (US); Benjamin Bushoy, Newton, MA (US)

(73) Assignee: EMC Corporation, Hopkinton, MA (US)

( * ) Notice: Subject to any disclaimer, the term of this patent is extended or adjusted under 35 U.S.C. 154(b) by 133 days.

(21) Appl. No.: 11/529,675

(22) Filed: Sep. 27, 2006

(51) Int. Cl.
*G06F 7/00* (2006.01)

(52) U.S. Cl. .................. 707/100; 707/104.1; 707/10; 707/3; 711/203; 711/202

(58) Field of Classification Search ............. 707/104.1, 707/100, 10, 3, 5; 711/203, 202
See application file for complete search history.

(56) References Cited

U.S. PATENT DOCUMENTS

| | | | |
|---|---|---|---|
| 653,884 A * | 7/1900 | Richard et al. ............... 62/331 |
| 6,012,067 A * | 1/2000 | Sarkar .................... 707/103 R |
| 6,298,352 B1 * | 10/2001 | Kannan et al. .............. 707/102 |
| 6,598,046 B1 * | 7/2003 | Goldberg et al. ............... 707/5 |
| 6,728,727 B2 * | 4/2004 | Komine et al. .......... 707/103 R |
| 6,915,309 B1 * | 7/2005 | Conley et al. ............ 707/104.1 |
| 6,976,090 B2 * | 12/2005 | Ben-Shaul et al. .......... 709/246 |
| 7,013,289 B2 * | 3/2006 | Horn et al. ................... 705/26 |
| 7,165,073 B2 * | 1/2007 | Vandersluis ................ 707/102 |
| 7,263,211 B2 * | 8/2007 | Yoshii et al. ................ 382/119 |
| 7,363,211 B1 * | 4/2008 | Naganathan et al. .......... 703/22 |
| 7,529,784 B2 * | 5/2009 | Kavuri et al. ............... 707/204 |
| 2002/0010798 A1 * | 1/2002 | Ben-Shaul et al. .......... 709/247 |
| 2002/0143774 A1 * | 10/2002 | Vandersluis .................. 707/10 |
| 2002/0161778 A1 * | 10/2002 | Linstedt ..................... 707/102 |
| 2002/0188614 A1 * | 12/2002 | King .......................... 707/100 |
| 2004/0181544 A1 * | 9/2004 | Anderson ................... 707/102 |
| 2005/0222969 A1 * | 10/2005 | Yip et al. ....................... 707/1 |
| 2006/0026016 A1 * | 2/2006 | Honda et al. .................. 705/1 |
| 2006/0036579 A1 * | 2/2006 | Byrd et al. ..................... 707/3 |
| 2006/0161554 A1 * | 7/2006 | Lucovsky et al. ............. 707/10 |
| 2007/0130172 A1 * | 6/2007 | Lee ............................ 707/100 |

* cited by examiner

*Primary Examiner*—Hosain T Alam
*Assistant Examiner*—Leon Harper
(74) *Attorney, Agent, or Firm*—Chapin IP Law, LLC

(57) ABSTRACT

A database manager maintains information (in a database) associated with each of multiple resources according to different domain models used to view the resources by corresponding topology services. Model consolidation (for the topology services) and a unique way of storing information associated with the models in the database enables the database manager to efficiently store, calculate, and retrieve topology objects from a database for multiple model-driven applications, which may have commonly defined portions of the domain models. The model consolidation solution provides flexibility and scalability in terms of defining cross-model functionality for model-driven applications. Additionally, the model consolidation solution also allows any model-driven topology service application to operate within a set of domain models derived from application needs.

14 Claims, 12 Drawing Sheets

MODEL CONSOLIDATION IN A DATABASE SCHEMA

RELATED APPLICATIONS

This application is related to United States Application entitled "UNIVERSAL DATABASE SCHEMA AND USE," Ser. No. 11,528,895, filed on the same day as the present application, the entire teachings of which are incorporated herein by this reference.

BACKGROUND

Information services and data processing industries in general have rapidly expanded as a result of the need for computer systems to manage and store large amounts of data. As an example, financial service companies such as banks, mutual fund companies and the like now, more than ever before, require access to many hundreds of gigabytes or even terabytes of data and files stored in high capacity data storage systems. Other types of service companies have similar needs for data storage.

Data storage system developers have responded to the increased need for storage by integrating high capacity data storage systems, data communications devices (e.g., switches), and computer systems (e.g., host computers or servers) into so-called "storage networks" or "Storage Area Networks" (SANs.)

In general, a storage area network is a collection of data storage systems that are networked together via a switching fabric to a number of host computer systems operating as servers. The host computers access data stored in the data storage systems (of a respective storage area network) on behalf of client computers that request data from the data storage systems. For example, according to conventional applications, upon receiving a storage access request, a respective host computer in the storage area network accesses a large repository of storage through the switching fabric of the storage area network on behalf of the requesting client. Thus, via the host computer (e.g., server), a client has access to the shared storage system through the host computer. In many applications, storage area networks support hi-speed acquisitions of data so that the host servers are able to promptly retrieve and store data from the data storage system.

Conventional storage area network management applications typically include a graphical user interface (GUI) that enables a network manager to graphically manage, control, and configure various types of hardware and software resources associated with a corresponding managed storage area network. For example, one conventional storage management application generates a graphical user interface utilized by a storage administrator to graphically select, interact with, and manage local or remote devices and software processes associated with the storage area network. Based on use of the graphical user interface in combination with an input device such as a hand operated mouse and corresponding pointer displayed on a viewing screen, a storage administrator is able to manage hardware and software entities such as file systems, databases, storage devices, volumes, peripherals, network data communications devices, etc., associated with the storage area network. Consequently, a storage management station and associated management software enables a storage administrator (a person responsible for managing the storage network) to manage the storage area network and its resources.

One way of managing resources associated with the storage area network is to maintain so-called managed objects (e.g., representing storage area network resources) and store corresponding information associated with the managed objects in a respective database. In general, a managed object is a software entity that defines a corresponding hardware or software resource of the storage area network.

Each managed object in a storage area network environment can have many different associated attributes. For example, a switch resource is one type of managed object found in a storage area network. The switch has associated attribute information such as make (e.g., manufacturer), model number, software version information, etc. As mentioned above, the actual data associated with this attribute information is stored in a relational database.

One conventional way to store information associated with the different managed objects is to store the object information in tables of a relational database. According to one conventional technique, each of multiple different types of attributes associated with a given managed object (e.g., a representation of a storage area network resource) are stored in a different respective table of a relational database. Thus, the greater the number of resources and corresponding attributes in the storage area network, the greater the number of tables that will be maintained in the relational database.

Foreign keys in tables of the relational database point to one or more other tables in the relational database to form associations. Use of the foreign keys enables a database manager to identify the associations and retrieve appropriate data from the tables in the database for given managed objects. After retrieval of appropriate data, a display process displays the retrieved information associated with a respective managed object in a form suitable for viewing by a storage area network administrator.

SUMMARY

Conventional applications that support management of objects having respective object data stored in relational databases suffer from a number of deficiencies. For example, as discussed above, conventional techniques of storing object data and attribute information associated with different storage area network resources requires a complex web of many different types of tables and associations in a relational database to store different types of information. Software to manage the relational database tables and display information associated with a managed object can be equally complex and cumbersome to maintain as the database tables themselves since conventional database schemas have separately stored model definitions defining different topology models as well as separately stored data associated with the different topology models.

Techniques discussed herein deviate with respect to conventional applications such as those discussed above as well as other techniques known in the prior art. For example, according to embodiments herein, a database manager maintains information (in a database) associated with each of multiple resources according to different domain models used to view the resources by corresponding topology services. So-called model consolidation (for storing information associated with storage area network topology viewing services) includes storing resource information associated with the models in a respective database such that the database manager can more efficiently store, calculate, and retrieve topology objects for multiple model-driven applications than in conventional applications.

For example, each of two different resource viewing applications (i.e., topology services such as different business applications that view the same physical devices) can produce a different topology view of storage area network resources according to different models. Suppose that a first topology viewing application enables viewing of information associated with a first model and a second topology viewing application enables viewing of information associated with a second model. The different topology views (e.g., different models) can include one or more storage area network resources common for viewing in both applications. Other resources may be present in one of the models for viewing only in a respective application but not the other.

Conventional applications have been used to store a separate schema (e.g., model definition and corresponding data values) for each model as discussed above. A database according to embodiments herein merges model definitions into a common database schema, but maintains separate data values for each model. Thus, database management of storage area network resource information includes collection of information about different topology viewing models, merging of model definitions at a metadata layer, and keeping track of which attributes belong to the different domain models.

This model consolidation solution (as will be discussed in more detail later in this specification) enables simplified searching for information associated with a given model as well as provides flexibility and scalability in terms of defining cross-model functionality for model-driven applications. Additionally, the model consolidation solution also allows any model-driven topology service application to operate within a set of domain models derived from application needs.

In a general embodiment that will also be discussed in more detail later in this specification, a relational database manager maintains (amongst other tables) a domain model table in a relational database. Records in the domain model table include unique identifier values specifying different domain models for managing and viewing different resource types in a storage area network environment. In addition to the domain model table, the database manager maintains one or more data tables in the relational database to store data values. Each of the data values includes a corresponding reference (e.g., foreign key) to a specific domain model in the domain model table to which the data values pertain. Other tables in the database can include records, each of which includes an identifier value indicating to which domain a record is associated. Thus, according to embodiments herein, the database manager can populate entries (e.g., records) of tables in the relational database with the unique identifier values to specify different domain models to which the records (e.g., data values) pertain.

The database manager can utilize the domain model table and the one or more data table in the relational database to define attributes of a given storage area network resource differently for each of multiple domain models. A search function can easily identify information associated with a given model based on reference values associated with the records.

Techniques herein are well suited for use in applications such as management of storage area network environments and related resource information as discussed herein. However, it should be noted that configurations herein are not limited to use in such applications and thus configurations herein and deviations thereof are well suited for use in other applications as well. In other words, according to one embodiment, techniques herein can be deployed to maintain any type of models and corresponding information in a database rather than storage area network resource information.

In addition to the embodiments discussed above, other embodiments herein include a computerized device (e.g., a host computer, workstation, etc.) configured to support the techniques disclosed herein to facilitate maintaining resource information as well as corresponding resource model information in a relational database. In such embodiments, the computerized device includes a memory system, a processor (e.g., a processing device), a display, and an interconnect. The interconnect supports communications among the display, the processor, and the memory system. The memory system is encoded with a management application that, when executed on the processor, supports database management according to embodiments herein.

Yet other embodiments of the present application disclosed herein include software programs to perform the method embodiment and operations summarized above and disclosed in detail below in the Detailed Description section of this disclosure. More specifically, one embodiment herein includes a computer program product (e.g., a computer-readable medium). The computer program product includes computer program logic (e.g., software instructions) encoded thereon. Such computer instructions can be executed on a computerized device to facilitate database management techniques according to an embodiment herein. For example, the computer program logic, when executed on at least one processor associated with a computing system, causes the processor to perform the operations (e.g., the methods) indicated herein as embodiments of the present disclosure. Such arrangements as further disclosed herein are typically provided as software, code and/or other data structures arranged or encoded on a computer readable medium such as an optical medium (e.g., CD-ROM), floppy or hard disk, or other medium such as firmware or microcode in one or more ROM or RAM or PROM chips or as an Application Specific Integrated Circuit (ASIC). The software or firmware or other such configurations can be installed on a computerized device to cause one or more processors in the computerized device to perform the techniques explained herein.

Yet another more particular technique of the present disclosure is directed to a computer program product that includes a computer readable medium having instructions stored thereon for managing resource information according to an embodiment herein. The instructions, when carried out by a processor of a respective computer device, cause the processor to: i) maintain a domain model table in a relational database, records in the domain model table including unique identifier values specifying different domain models for managing and viewing different resource types in a storage area network environment; ii) maintain at least one data table in the relational database to store data values as well as corresponding references to specific domain models in the domain model table to which the data values pertain; and iii) utilize the domain model table and the at least one data table in the relational database to define attributes of a given storage area network resource differently for each of multiple domain models.

Other embodiments of the present application include software programs to perform any of the method embodiment steps and operations summarized above and disclosed in detail below.

It is to be understood that the system of the present application can be embodied solely as a software program, or as a software program operating in conjunction with corresponding hardware. For example, embodiments of the present application may be implemented as a component or related component of EMC's Control Center (ECC) software application that provides graphical management functionality associated with storage area network resources. Embodiments of the present application may also be implemented in computer devices that operate the Control Center (ECC) software. Control Center software is manufactured by EMC Corporation of Hopkinton, Mass., USA.

BRIEF DESCRIPTION OF THE DRAWINGS

The foregoing and other objects, features, and advantages of the present application will be apparent from the following more particular description of preferred embodiments of the present disclosure, as illustrated in the accompanying drawings in which like reference characters refer to the same parts throughout the different views. The drawings are not necessarily to scale, with emphasis instead being placed upon illustrating the embodiments, principles and concepts.

DETAILED DESCRIPTION

According to one embodiment, a database manager maintains information (in a database) associated with each of multiple resources according to different domain models used to view the resources by corresponding topology services. Model consolidation (for topology viewing services of a storage area network) includes storing resource information associated with the models in the database such that the database manager can efficiently store, calculate, and retrieve topology objects (from the database) for multiple model-driven applications, which may have commonly defined portions of the domain models. The model consolidation solution as further described herein provides flexibility and scalability in terms of defining cross-model functionality for model-driven applications. Additionally, the model consolidation solution also allows any model-driven topology service application to operate within a set of domain models derived from application needs.

Figure 1:
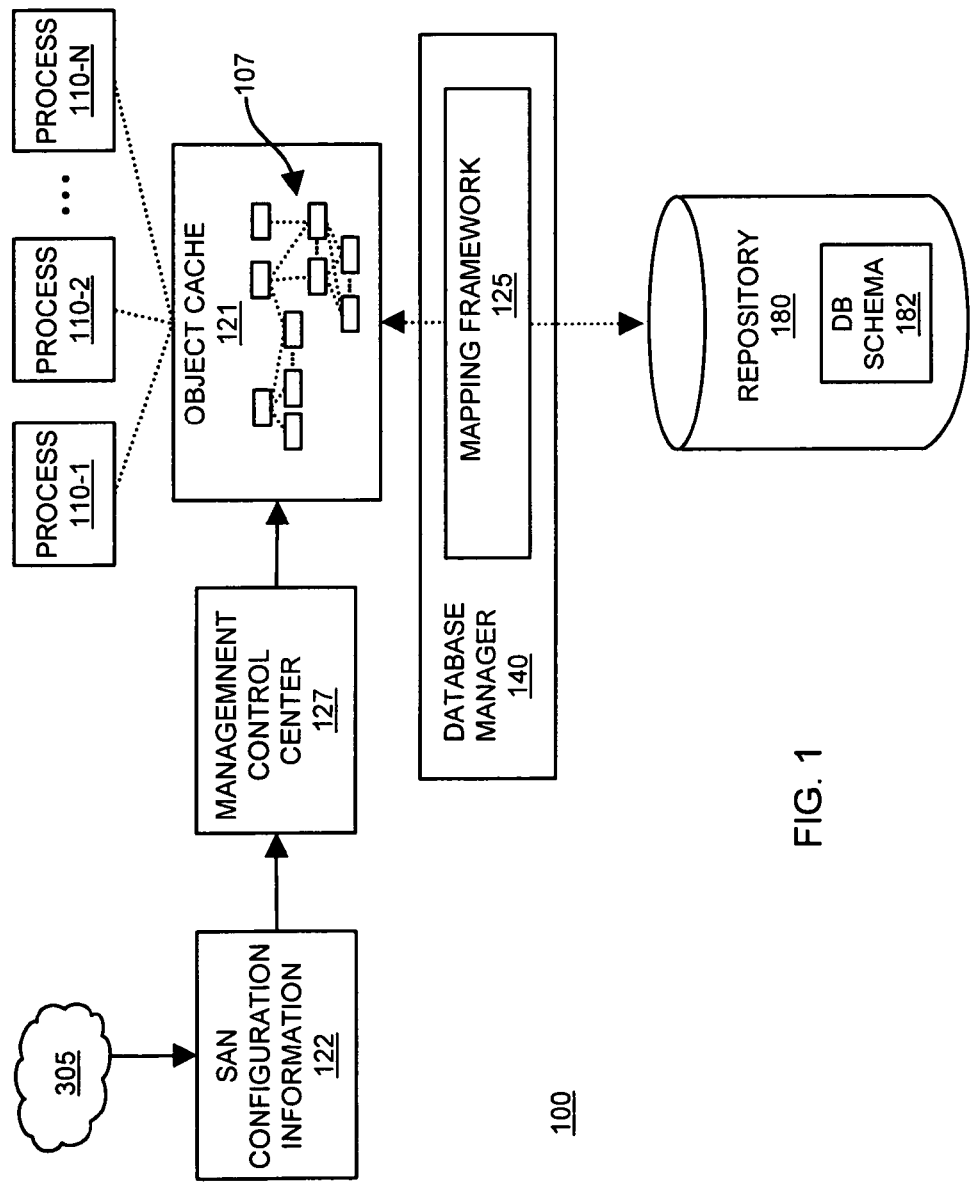
FIG. 1 is a diagram illustrating an environment for maintaining and utilizing information in a relational database according to embodiments herein.

FIG. 1 is a block diagram of a storage area network environment 100 according to an embodiment herein. As shown, storage area network environment 100 includes management process 110-1, management process 110-2, ... management process 110-N (collectively, management processes 110 for viewing storage area network resources), management control center 127, storage area network 305, object cache 121, object hierarchy 107, database manager 140, mapping framework 125, storage area network configuration information 122, and repository 180. Repository 180 includes database schema 182 for storing storage area network resource information in multiple tables (as will be discussed in FIG. 2).

In general, agents in storage area network 305 collect storage area network configuration information. The management control center 127 creates managed objects based on the SAN configuration information 122 received from agents distributed throughout storage area network 305. Via management control center 127, object cache 121 stores object hierarchy 107. Object hierarchy 107 includes multiple instantiated objects representing resources in the storage area network environment 100. The managed objects in object hierarchy 107 correspond to or reflect the configuration of storage area network environment 100.

Management processes 110 utilize information in the object cache 121 in order to display respective images of current configuration information (e.g., topology viewing information) associated with storage area network environment 100. For example, management processes 110 in part represent one or applications executed by network administrators. The management processes access the managed objects (e.g., resource information) in object cache 121 based on information in repository 180, enabling the network administrators to view configuration information associated with storage area network environment 100.

A respective network administrator viewing the configuration images associated with the storage area network environment 100 can initiate changes to the object hierarchy 107 such as addition or deletion of one or more managed objects. Modifications to the object hierarchy 107 affect contents of repository 180 because, as mentioned above, repository 180 stores the information associated with object hierarchy 107.

Note that an actual instantiation of object hierarchies (e.g., what managed objects exist in a respective object hierarchy 107) can vary depending on how a respective storage area network is actually configured for operation in the storage area network environment 100. Also, note that in addition to the examples of object hierarchies discussed herein, examples of other sample managed object hierarchies associated with the storage area network can be found in related U.S. patent application Ser. No. 11/001,489 entitled "METHODS AND APPARATUS FOR DEALLOCATION OF RESOURCES," filed on Dec. 1, 2004, the entire teachings of which are incorporated herein by this reference.

Figure 2:
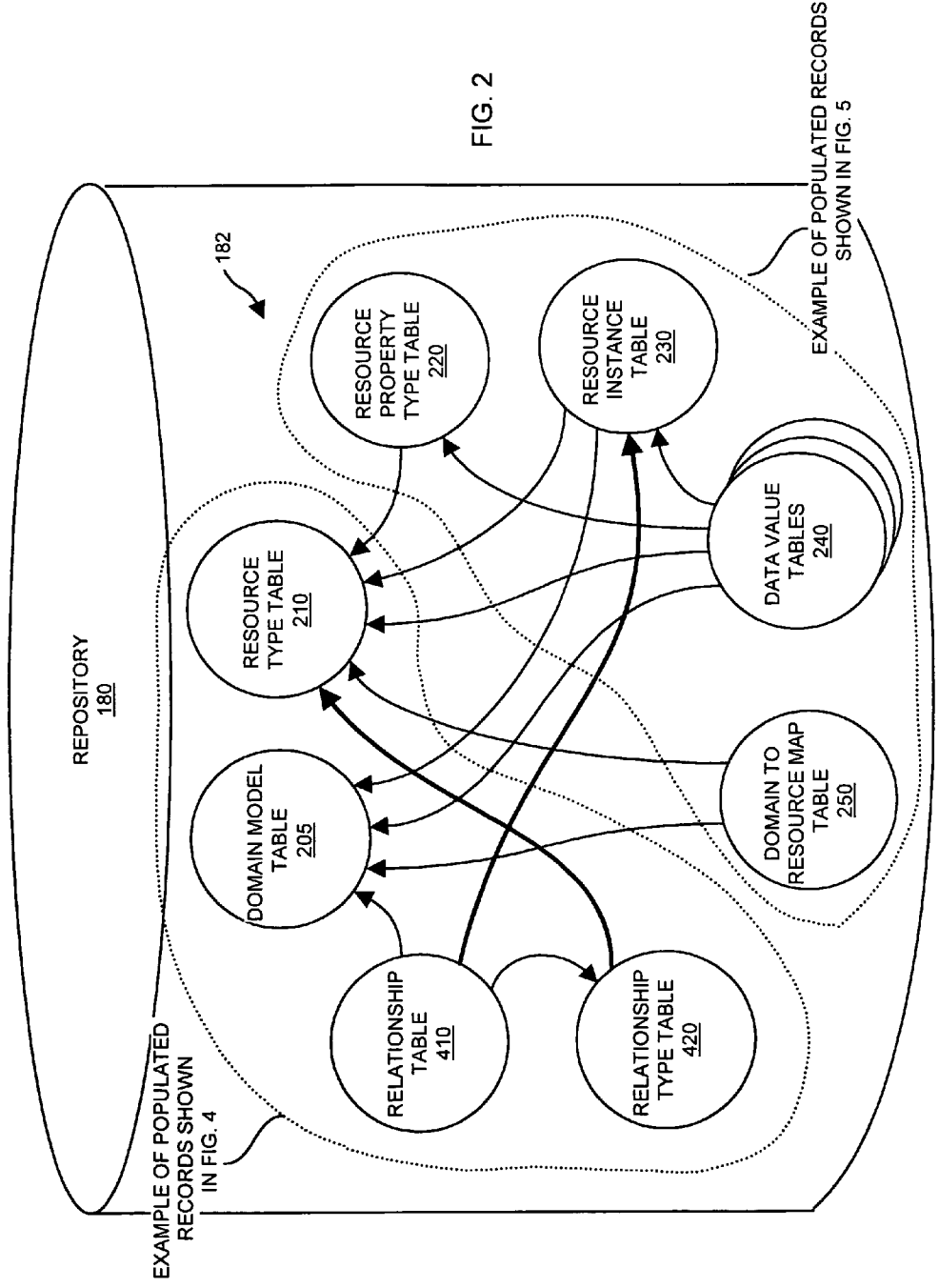
FIG. 2 is a diagram illustrating a general data structure of multiple database tables for storing information in a relational database according to an embodiment herein.

FIG. 2 is a block diagram generally illustrating how repository 180 and database manager 140 stores resource information associated with storage area network environment 100 in a database according to embodiments herein. As shown, repository 180 includes a database schema 182 of multiple tables such as domain model table 205, resource type table 210, resource property type table 220, resource instance table 230, data value tables 240, domain to resource map table 250, resource type table 420, relationship table 410. As will be discussed, certain tables in the database schema 182 include references (e.g., foreign keys) to records in other tables as shown by arrows (e.g., foreign keys) pointing from one table to another. The arrows in FIG. 2 from table to table represent one or more foreign keys in a record of one table that points to respective one or more records in another database table.

Figure 4:
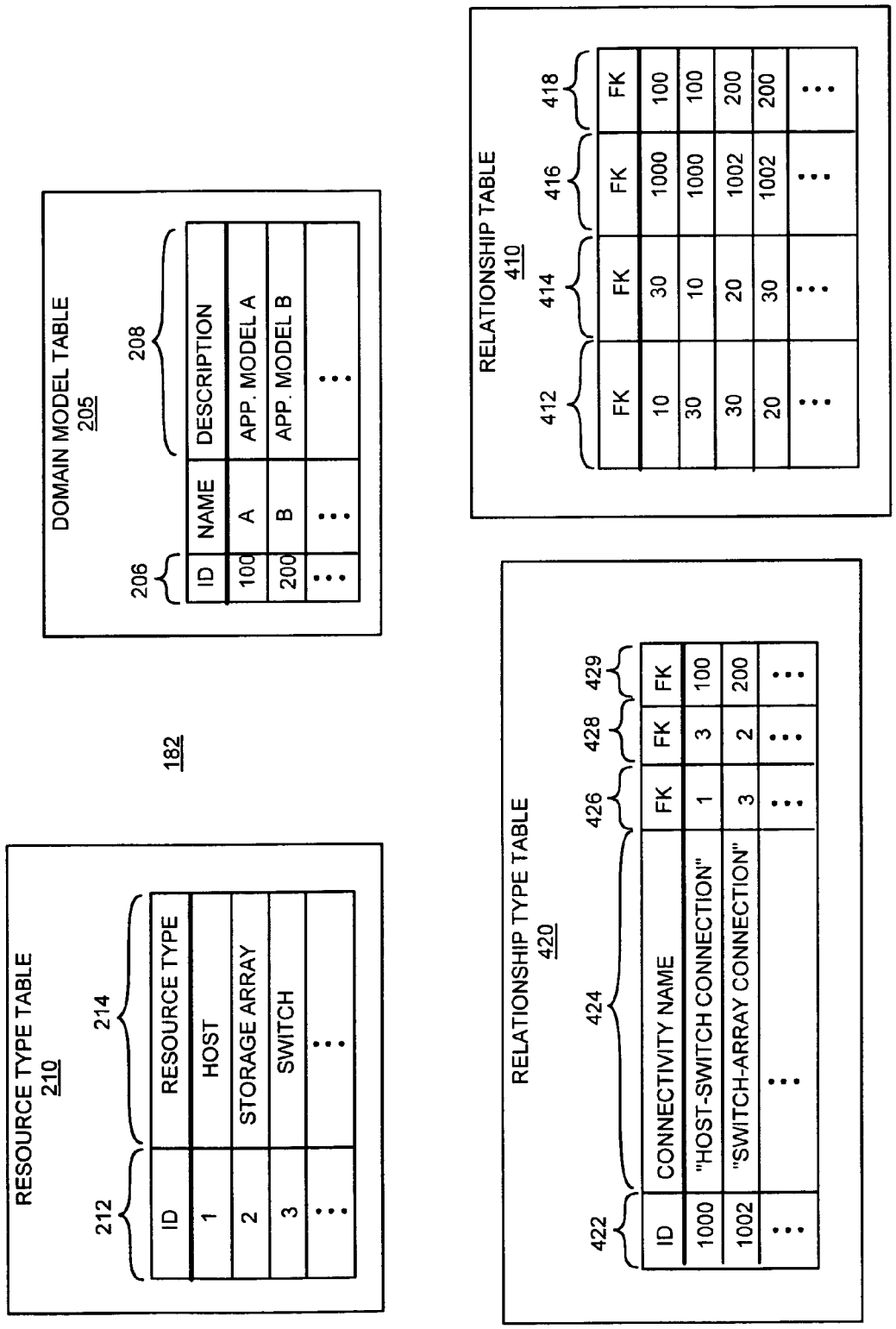
FIGS. 4 and 5 include multiple tables and corresponding record information representing the storage area network environment in FIG. 3 according to an embodiment herein.
Figure 5:
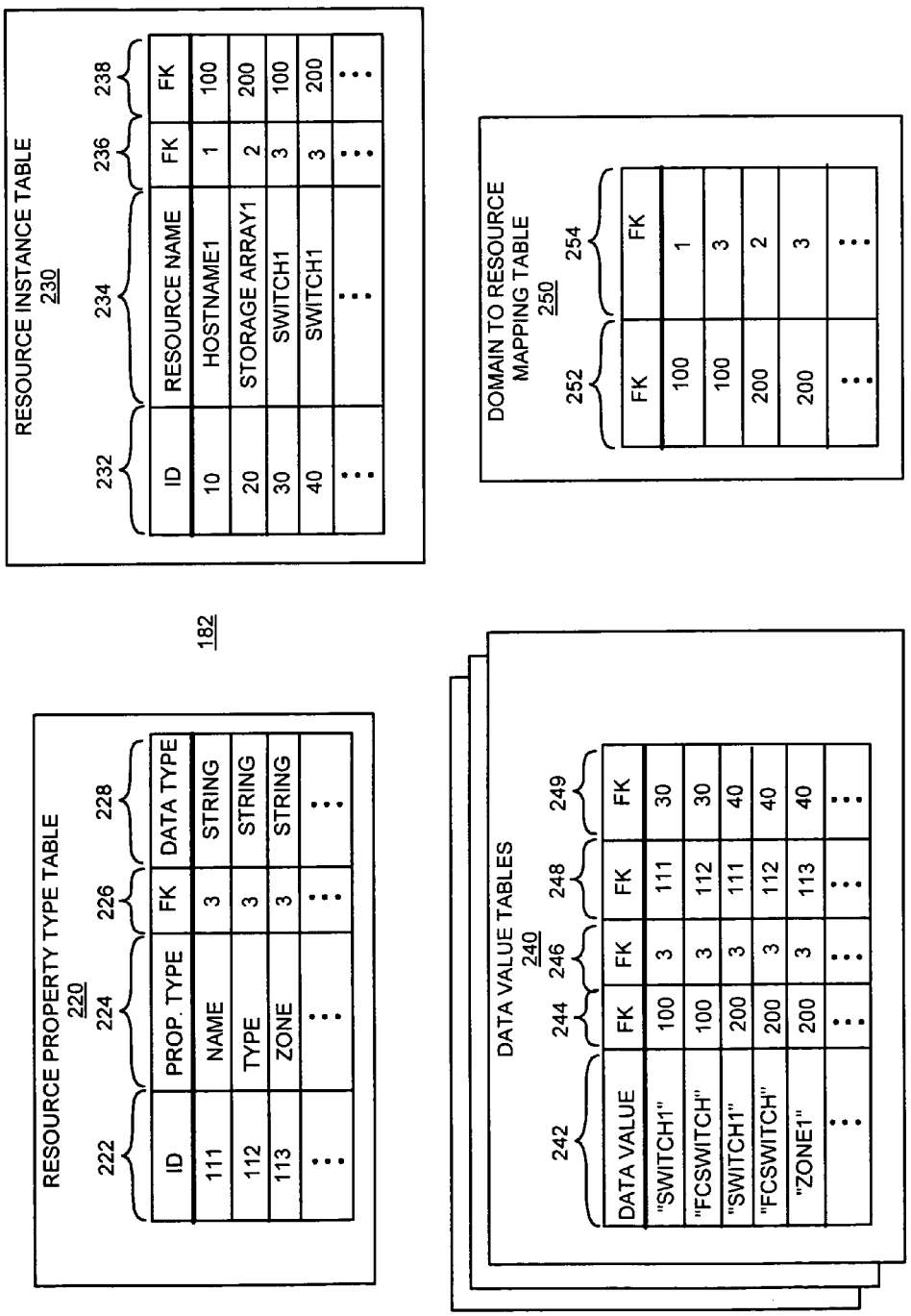

In one embodiment, each record in relationship table 410 includes a foreign key to a record in the domain model table 205, a foreign key to a record in the resource type table 420, and two foreign keys to respective records in the resource instance table 230. Each record in resource property type table 210 includes a foreign key to a record in the resource type table 210. Each record in the domain to resource map table 250 includes a foreign key to a respective record in the domain model table 205 as well as a foreign key to a respective record in the resource type table 210. Each record in the data value tables 240 includes a respective data value as well as a foreign key to a record in the domain model table 205, a foreign key to a record in the resource type table 210, a foreign key to a record in the resource type table 220, and a foreign key to a respective record in the resource instance table 230. Each record in the resource instance table 230 includes a foreign key to a respective record in the domain model table 205 and a foreign key to a respective record in the resource type table 210. Lastly, each record in the resource property type table 220 includes a foreign key to a respective record in the resource type table 210. An example of the tables and corresponding record information (including corresponding foreign key information) is illustrated in FIGS. 4 and 5 as will be discussed later in this specification. For example, FIGS. 4 and 5 include diagrams illustrating population of records with information according to the storage area network configuration illustrated in FIG. 3.

Figure 3:
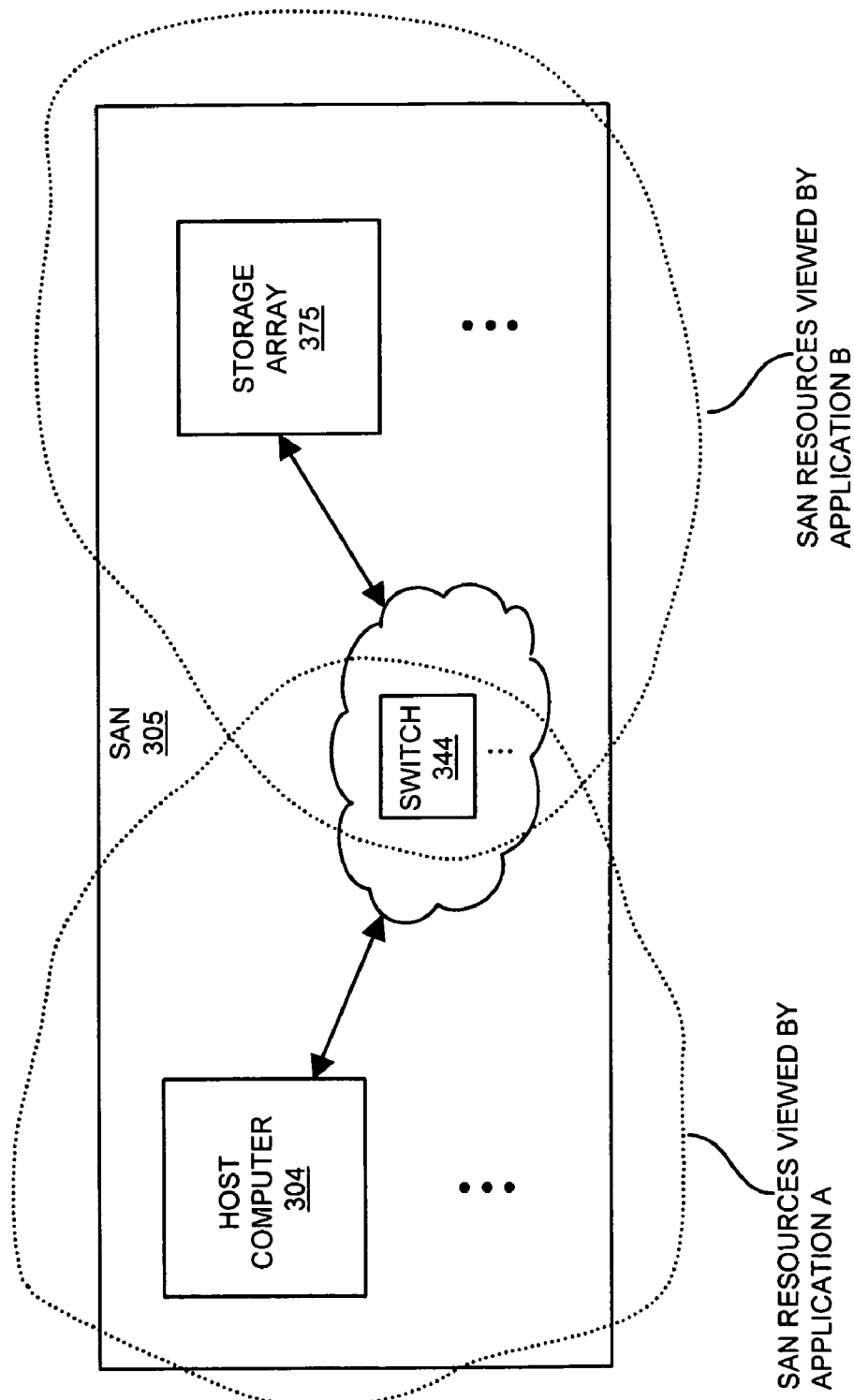
FIG. 3 is a diagram of a sample storage area network environment viewed differently by multiple topology viewing services according to embodiments herein.

FIG. 3 is a diagram illustrating an example of the resources in a storage area network 305 according to embodiments herein. As shown, storage area network 305 includes an interconnection of one or more host computers connected through switches in a switch fabric to one or more storage arrays that store data. Host computers in a storage area network communicate through switches to access the data from storage arrays on behalf of respective clients. Thus, the host computers can viewed as servers with respect to one or more clients requesting access to data in storage arrays of storage area network 305.

As previously discussed, storage area network administrators can initiate execution of different types of viewing applications to view resources in the storage area network 305. As shown in the present example, a network administrator can utilize (e.g., execute) business application A (e.g., a topology viewing service) to produce a physical topology view of one or more host computers and corresponding switches. In the present example, application A enables viewing of resource information associated with resources such as host computer 304 and switch 344. A network administrator can utilize application B (e.g., another topology viewing service) to produce a physical topology view of one or more switches and corresponding storage arrays in storage area network 305. In the present example, application B enables viewing of resource information associated with resources such as switch 344 and storage array 375.

According to embodiments herein, models consolidation for the topology services includes maintaining application object models as abstract data and metadata sources, which may or may not have common elements with another application object model. A general use for model consolidation can be described as follows:

A set of independent applications implement a set of independent functional requirements. Those applications operate on their own domain models, which may be subsets of the common, "consolidated" cross-domain model. A new application (e.g., application C) may be created to manage this so-called "super" domain. Such a "management" application operates on consolidated model and data view of all underlying data source applications. The fact that some management solutions can operate on the data collected by the multiple sources should not affect design and/or functionality of these data source applications.

Consolidation Rules:

Embodiments herein use object type names as a basic consolidation rule for merging domain data because topology service operates with ECIM—compliant application models. In other words, all objects defined within different application-specific models having the same name are treated as a single object by the respective topology service. This same rule can be applied to definitions of the object attributes for all involved models.

Domains:

In one embodiment, topology services (e.g., topology viewing applications) operate within topological domains. Every domain has a separate namespace, which can be used by one or more applications. To use the same domain applications, there are identical domain objects models. Topology services can automatically merge all registered domains into a single topological view.

A topology viewing service (e.g., a viewing application) can support a single "super" view across all domains registered with the service. The embodiments herein can be modified to support topology aggregations based on the subset of topologies and building of multi-level tree-like structure of joint topology views.

Scope:

There are cases when a viewing application doesn't define its own model, but instead relies on models defined (and data collected) by other applications such as application A and application as described herein. An application can define its namespace as the set of namespaces of other applications and use data and model elements derived from these applications to provide an aggregated view for its topology. The scope is used to identify such sets of domains.

Implementation

Topology service allows searching and managing single domain topology, as well as presenting selected domains (namespaces) as the single top-level joint topology view. This ability allows supporting of multiple independent applications with their unique topologies in a single RDBMS (Relational Database Management System) repository, sharing of a single installation of the topology service, and providing of topology services for both single-application and cross-application levels.

Possible Features/Rules of a Repository Design:

Repository stores only one unique description of every topology node (e.g., storage area network resource).

Each topology node is associated with one or more domain models.

Each domain model has its own instance.

FIGS. 4 and 5 are diagrams illustrating how each of multiple tables in the database schema 182 are populated to store information associated with resources in the storage area network 305. For example, as previously discussed, database schema 182 includes a multitude of inter-related tables and corresponding information for storing object information associated with each of multiple storage area network resources. The present example illustrates one way of keeping track of object information associated with the resources shown in FIG. 3 according to different viewing models. However, the tables can be populated with additional record information to reflect any number of resources in the storage area network. Additionally, the tables can be populated to store information according to any number of different domain models for viewing the storage area network resource information.

Resource type table 210 stores records that specify different possible types of resources in the storage area network environment. For example, column 212 indicates unique identifiers assigned to corresponding type of resources that may be present in the storage area network 305 in FIG. 3. Column 214 includes respective character strings identifying a corresponding resource type. As shown in resource type table 210, host resources have a respective assigned unique ID=1; storage arrays are assigned a unique ID=2; switch resources are assigned a unique ID=3, and so on. Although the listing is not exhaustive, additional types of resources associated with storage area network 305 can be found in FIG. 11. Thus, the property resource type table 210 can include additional respective entries (e.g., row of information) for many more types of storage area network resources.

Referring again to FIG. 4, domain model table 205 includes records of information specifying different types of domain models for keeping track of and viewing information associated with storage area network 305. For example, column 206 in domain model table 205 includes a listing of unique identifier values assigned to different models (column 208) for viewing storage area network resource information. As an example, model A (for viewing storage area network resource information in business application A) has been assigned a unique identifier value of 100; model B (for viewing storage area network resource information in business application B) has been assigned a unique identifier value of 200; and so on.

Relationship type table 420 stores records that specify different possible types of resource relationships in the storage area network environment. For example, column 422 indicates unique identifiers assigned to corresponding types of possible relationships between different resources in the storage area network 305. Column 424 includes a physical description of a respective relationship type identified by the records in relationship type table 420. Column 426 and column 428 include a foreign key pairing identifying entries in the resource type table 210. Each foreign key pairing for a given record specifies the different types of resources associated with a given relationship record in the relationship type table 420. The foreign keys in column 429 identify entries in domain model table 205 in order to indicate which domain model the relationship pertains.

As shown, relationship table 410 includes references (i.e., foreign keys) to resource instance table 230 (in FIG. 5) as well as relationship type table relationship type table 420 and domain model table 205. For example, relationship table 410 includes column 412, column 414, column 416, and column 418 of foreign keys. For each respective record (e.g., row) in relationship table 410, values (e.g., foreign keys) in column 412 and column 414 identify a respective pair of resources in resource instance table 230 (FIG. 5). The pair of resources identified by these foreign keys represents actual resources in the storage area network 305 that are related to each other. Column 416 of relationship table 410 includes foreign keys identifying entries in relationship type table 420. For a given record, the foreign key in column 416 points to information identifying a relationship type associated with the first and second resources as specified by foreign keys in column 412 and 414. Column 418 includes foreign keys identifying a domain model in domain model table 205 to which the respective record pertains.

As shown in FIG. 5, the database manager 140 maintains a resource instance table 230 (e.g., an object instance table). The resource instance table 230 includes records (e.g., rows or entries) identifying the different resources actually present in the storage area network 305. For example, each record in the resource instance table 230 includes: i) a unique identifier value in column 232 specifying a respective resource of the storage area network 305, ii) a character string of information in column 234 of a respective unique name assigned to the resource in the storage area network 305, iii) a foreign key (e.g., reference) in column 236 specifying an entry (e.g., record, row, etc.) in the resource type table 210 identifying a resource type associated with the respective resource in the storage area network 305, and iv) a foreign key in column 238 specifying a domain model to which the resource pertains.

As an example, the first entry (i.e., row) in resource instance table 230 indicates that the resource named HOSTNAME1 has a corresponding assigned unique integer ID value=10 and a respective foreign key (e.g., having a data value equal to 1) pointing to the first row of resource type table 210 (FIG. 4). This foreign key provides an indication that HOSTNAME1 is a HOST type resource. The foreign key in column 238 for HOSTNAME1 indicates that the resource is associated with application model A.

The second entry (e.g., record) in resource instance table 230 indicates that the resource named STORAGE ARRAY1 has a corresponding unique integer ID value=20 and a respective foreign key (e.g., having a data value equal to 2) pointing to the second row of resource type table 210 (FIG. 4). This provides an indication that STORAGE ARRAY1 is a STORAGE ARRAY type resource. The foreign key=200 in column 238 for the second record indicates that the resource is associated with the domain model B. Thus, each entry in resource instance table 230 identifies both an actual resource in the storage area network as well as a type of the resource and a domain model to which a given resource pertains.

Note that resource instance table 230 includes two different records for the same physical switch (i.e., SWITCH1) in storage area network 305. For example, the first instance (e.g., third row in resource instance table 230) of SWITCH1 has been assigned a unique identifier value of 30. The second instance (fourth row of resource instance table 230) of SWITCH1 has been assigned a unique identifier value of 40. The foreign keys in column 238 indicate that the first instance of SWITCH1 pertains to domain model A while the second instance of SWITCH1 pertains to domain model B. Accordingly, the resource instance table 230 can be used to maintain multiple instances of the same physical resource merely via use of a domain model foreign key.

Resource property type table 220 stores records (e.g., rows) of information that specify different property types associated with each of the different possible types of resources specified in the records of the resource type table 210 (FIG. 4). In one embodiment, the resource property table 220 is a single table including a superset of all the different property types associated with the different resources specified in the resource type table. As an example, suppose that i) a first resource such as host computers (e.g., ID=1) may have 8 different properties or attributes for storage in repository 180; ii) a second resource type such as a storage array (e.g., ID=2) in storage area network environment 100 may have 10 different properties or attributes for storage in repository 180; iii) a third resource such as switches (e.g., ID=3) may have 22 different properties or attributes for storage in repository 180; and so on. In such a case, 8 rows of resource property type table 220 are dedicated for storing the 8 different property identifiers associated with host computers; 10 rows of resource property type table 220 are dedicated for storing the 10 different property identifiers associated with storage arrays; 22 rows of resource property type table 220 are dedicated for storing the 22 different property identifiers associated with switches; and so on.

As shown, each row in resource property type table 220 includes a corresponding unique ID (e.g., an identifier as specified in column 222) associated with a respective property type or attribute. Additionally, each row in resource property table 220 includes character string information in column 224 describing the respective attribute. For example, a first row of resource property type table 220 indicates that property type NAME is assigned a unique ID=111; a second row of resource property type table 220 indicates that the property type TYPE is assigned a unique ID=112; a third row of resource property type table 220 indicates that ZONE is assigned a unique ID=113; and so on. Column 226 indicates a respective resource type to which the property type pertains. In this example, the properties NAME, TYPE, and ZONE are attributes associated with switch type resources (e.g., foreign key=3 in column 226) in storage area network 305. Column 228 indicates respective data types associated with the different property types listed in resource property type table 220. In this example, the corresponding data types are string values.

Domain to resource mapping table 250 provides a mapping between different domain models and resource types. For example, column 252 in domain to resource mapping table 250 specifies a first foreign key value indicating one of multiple domain models in domain model table 205 (FIG. 5). Column 254 specifies a second foreign key to a type of resource to which the given domain model pertains. Accordingly, domain to resource mapping table 250 identifies which resource types pertain to the different domain models.

The data tables 240 in repository 180 store data for the property types (e.g., attributes or properties) specified in resource property table 220. As will be discussed later in this specification, the data values can pertain to one of the different models as specified by domain model table 205 (FIG. 4).

Depending on the embodiment, column 242 of a particular one of data tables 240 can be: i) an integer data table to store integer data associated with resources in storage area network 305, ii) a binary data table to store binary data associated with resources in storage area network 305, iii) a floating decimal data table to store floating decimal data associated with resources in storage area network 305, or iv) a character string table to store character string information associated with resources in storage area network 305, etc.

As mentioned above, each of the one or more data tables 240 stores data of the same data type (e.g., character string type data, integer type data, floating decimal type data, numerical data, etc.) even though the data stored in a given data table is associated with different types of storage area network resources, different properties associated with the storage area network resources, and/or different domain models for viewing the storage area network resource information. Thus, one embodiment herein includes storing data by type rather than storing different property or attribute information in different tables.

Each of the entries (e.g., rows, records, etc.) in the data tables 240 can include data values (such as in column 242) associated with the storage area network environment 100 as well as one or more references (e.g., foreign keys in respective column 244, column 246, and column 248) to entries of other tables in repository 180. For example, as shown in FIG. 5, column 242 stores character string information (e.g., data values) associated with resources in the storage area network 305. The foreign keys in column 244 specify a domain model in domain model table 205 to which the data pertains. The foreign keys in column 246 specify a type of storage area network resource in resource type table 210 to which the data pertains. The foreign keys in column 248 specify a respective property type or record in resource property type table 220 to which the data pertains. The foreign keys in column 249 specify a resource instance in resource instance table 230 to which the data pertains.

According to the example shown, data value tables 240 of FIG. 5 illustrate how multiple sets of data are maintained for each of multiple domain models. In other words, the data (in a table of data value tables 240) for a given resource such as switch 344 that is viewable in two or more different domain models is maintained separately (e.g., not merged) in repository 180.

For example, the first two records in data value tables 240 indicate that data values "SWITCH1" and "FCSWITCH1" are pertinent when viewing the instance of SWITCH1 (as indicated by foreign key=30 to resource instance table 230) according to domain model A (because the foreign keys for the first two records in column 244 equals 100). The next three entries (e.g., rows or records 3, 4, and 5) in data value tables 240 indicate that data values "SWITCH1," "FCSWITCH1", and "ZONE1" are pertinent when viewing the instance of SWITCH1 (as indicated by foreign key=40 to resource instance table 230) according to domain model B (because the foreign key in column 244 equals 200).

In one embodiment, database manager 140 stores data tables 240 so that each table stores data in a contiguous range of address locations in repository 180. Since a respective storage area network 305 can include many resources, each of which has many different properties (and/or potentially different properties and corresponding data values depending on the domain model chosen for viewing purposes), the repository 180 can store a few or relatively small number of very large tables (e.g., the resource type table 210, resource property table 220, resource instance table 230, and a respective table for each data value type) rather than many small tables, which are more difficult to search. Storage of data in a few large database tables as discussed herein rather than many small database tables as in conventional methods improves search efficiency because foreign keys associated with the data values indicate appropriate information about the data. Accordingly, managed object information (e.g., storage area network resource information) in the database can be identified and retrieved more quickly via the appropriate queries using relevant foreign keys.

More specifically, each data value (e.g., record in a data value tables 240) contains a foreign key (record identifier) to a corresponding property type in the property type table 220, which in turn has a foreign key to an entry in the resource type table 210. As discussed above, this links the property type to the object type to which it belongs. Each record in the resource instance table 230 has a foreign key to the resource type table 210 as well, basically closing the loop connecting the property value to the object instance. An additional foreign key in the resource property table 220 identifying the record in the resource instance table 230 is just a shortcut connecting the property value to the appropriate object instance, allowing faster execution of some common queries. The inclusion of foreign keys to the domain model table 205 enables easier identification and retrieval of information from database depending on the type of domain model viewing application.

As previously discussed, each of the data tables 240 can include different types of resource data that are each stored as contiguous blocks of data for simplified searching. For example, the database 140 can maintain a first data table (e.g., one of data tables 240) to store a first type of data (e.g., integer data) associated with multiple different types of resources present in the storage area network environment 100. In one embodiment, the database manager 140 stores the information in the first data table as a first contiguous block of searchable data. Additionally, the database manager 140 can maintain a second data table (e.g., one of data tables 240) to store a second type of data (e.g., character string data) associated with multiple different types of resources present in the storage area network environment 100. The database manager 100 also stores the information in the second data table as a second contiguous block of searchable data.

Figure 6:
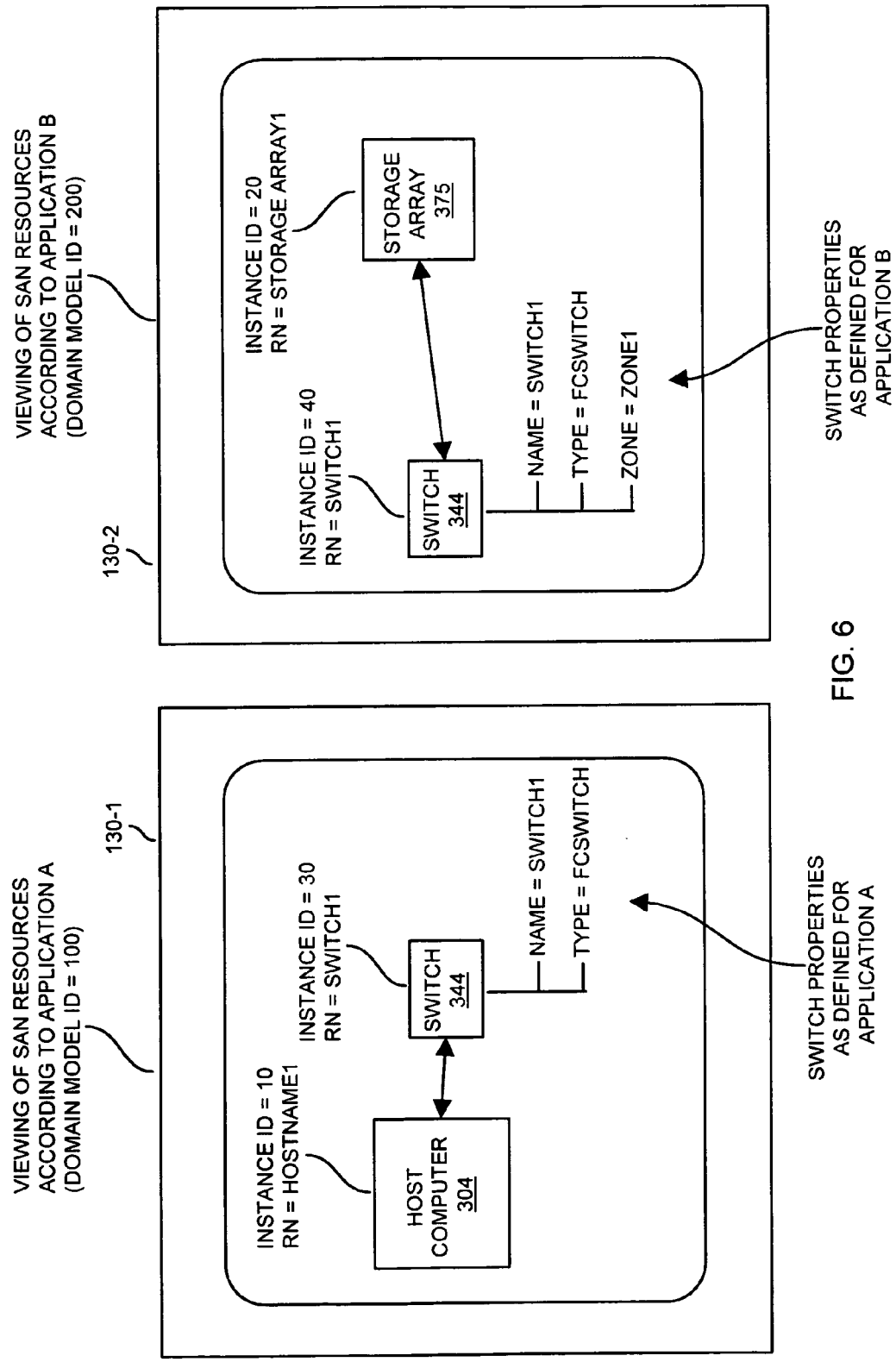
FIG. 6 is a diagram illustrating two different views of storage area network resources according to two different viewing applications according to embodiments herein.

FIG. 6 is a diagram illustrating different views of storage area network resources via different viewing applications according to embodiments herein. In general, the database manager 140 enables management application A to use a portion of the data values in the data value tables 240 to view switch 344 according to a first domain model. The database manager 140 also enables management application B to use a different portion of data values in the data value tables to view the given storage area network resource according to a second domain model. Application B (and the second domain model) support a different viewing of the switch 344 and its associated attributes than as supported by application A.

For example, as shown, viewing application A utilizes information stored in database schema 182 of repository 180 as discussed above to provide a viewing of a visual representation of host computer 304 and switch 344 on display screen 130-1. Viewing application B retrieves and utilizes information stored in database schema 182 of repository 180 to provide a viewing of a visual representation of switch 344 and storage array 375 on display screen 130-2. Note that physical switch 344 (having resource name=SWITCH1) is commonly displayed in both viewing application A and viewing application B. However, display screen 130-1 provides a different view of switch property attributes than as shown on display screen 130-2.

For example, based on information stored in repository 180, application A provides a visual indication on display screen 130-1 that a resource name of the switch 344 is SWITCH1 and a corresponding type of the switch 344 is FCSWITCH. Based on data in repository 180 that is maintained separately from that used by application A as discussed above, application B provides a visual indication on display screen 130-2 that a name of the switch 344 is SWITCH1 and a corresponding type of the switch 344 is FCSWITCH. Additionally, however, application B provides a visual indication that switch 344 has a zone property attribute of ZONE=ZONE1. Thus, even though the same attribute can be viewed in two different applications, each application can provide a different viewing of properties and/or data. That is, database schema 182 enables storing of different data for commonly viewed resources.

Note that the database manager 140 can utilize the domain model table 205 and the data value tables 240 to store information associated with resources that are viewed only in one domain but not the other. For example, suppose that the host computer 304 is viewable only by application A and that storage array resource 375 is viewable only by application B. In such a case, the database manager 140 defines attributes of the host computer 304 for a first domain model that is viewable by application A but is not viewable by application B. Additionally, the database manager 140 defines attributes of the storage array 375 for a second domain model that is viewable by application B but that is not viewable by application B.

Let's add application C to our sample as discussed above for applications A and B. Assume that application C has its own model, which includes computers, ports and switches and that application C uses all data discovered and instantiated by applications A and B.

A topology service normally provides correct functionality for independent applications A and B simultaneously with functionality for application C without affecting lifecycle, design and/or functionality of all three involved into sample applications.

To satisfy need of simultaneous support of the commonly-defined namespace and multiple per domain model namespaces we developed a few rules and techniques described below.

Definition/Merging Rules for Viewing:

1. All objects definitions are merged by name within topology service. Every object definition has list of the models where that definition is presented.

2. All object attributes definitions are merged by name of the attribute and name of the object to which it belongs. Every attribute definition has list of the models where that definition is presented.

3. All links definitions are not merged. Every link definition exists only within namespace of the single domain model.

4. All instantiated objects, attributes and links are not merged and stored within their own namespace, which is a specific domain model.

A main purpose of these rules is to build single common "super" domain model using all loaded into topology service application models and preserve ability to independently operate within namespace of the each application model.

By applying these rules to our sample: a switch object definition will be stored only once within metadata repository of the topology service, but there will be two instances of the switch 344. One instance of switch 344 is presented by application A. One instance of switch 344 is presented by application B.

Data Population

According to one embodiment, instantiated data are stored within namespaces defined by each domain model. Such a storage method produces some redundant data (as discussed above) in cases when a same attribute of the same object was instantiated by two or more different applications. However, this data redundancy allows topology service to operate within every specific namespace without runtime overhead related to identifications of the instances.

Benefits of the "separate" storing of the instantiated data are:

Data collected by any model-driven application can be exposed via topology services without any modifications of the application side.

Any application that uses topology service can operate within it own namespace independently from all other applications that use the same service.

Applications have freedom of modifying, updating and deleting of their application data and model definitions without affecting other applications, which use the same topology service.

Applications can include data discovered and presented by other applications using single entry point and single interface—Topology Service.

Simplified maintenance for any domain model/data changes and updates.

Implementation flexibility for any cross-application data exchange and/or transformation methods.

High performance of single-domain as well as cross-domain operations.

Data Search

The namespace of the topology service is a "super" model built from all domain models of the applications and all data instantiated by all applications. All topology services algorithms operate within this namespace.

All data search algorithms within topology services use scopes to determine visible data set for each application.

Topology services allow every application to define a set of individual namespaces used by other applications. Such set of namespaces we call Scope.

Scope can include 1 or more namespaces used by other applications. Every application that uses topology services has exactly same interface and functionality with all other applications regardless of the scope of every individual application.

Scope allows standard cross-application data navigation and searching for all served by topology service applications.

Figure 7:
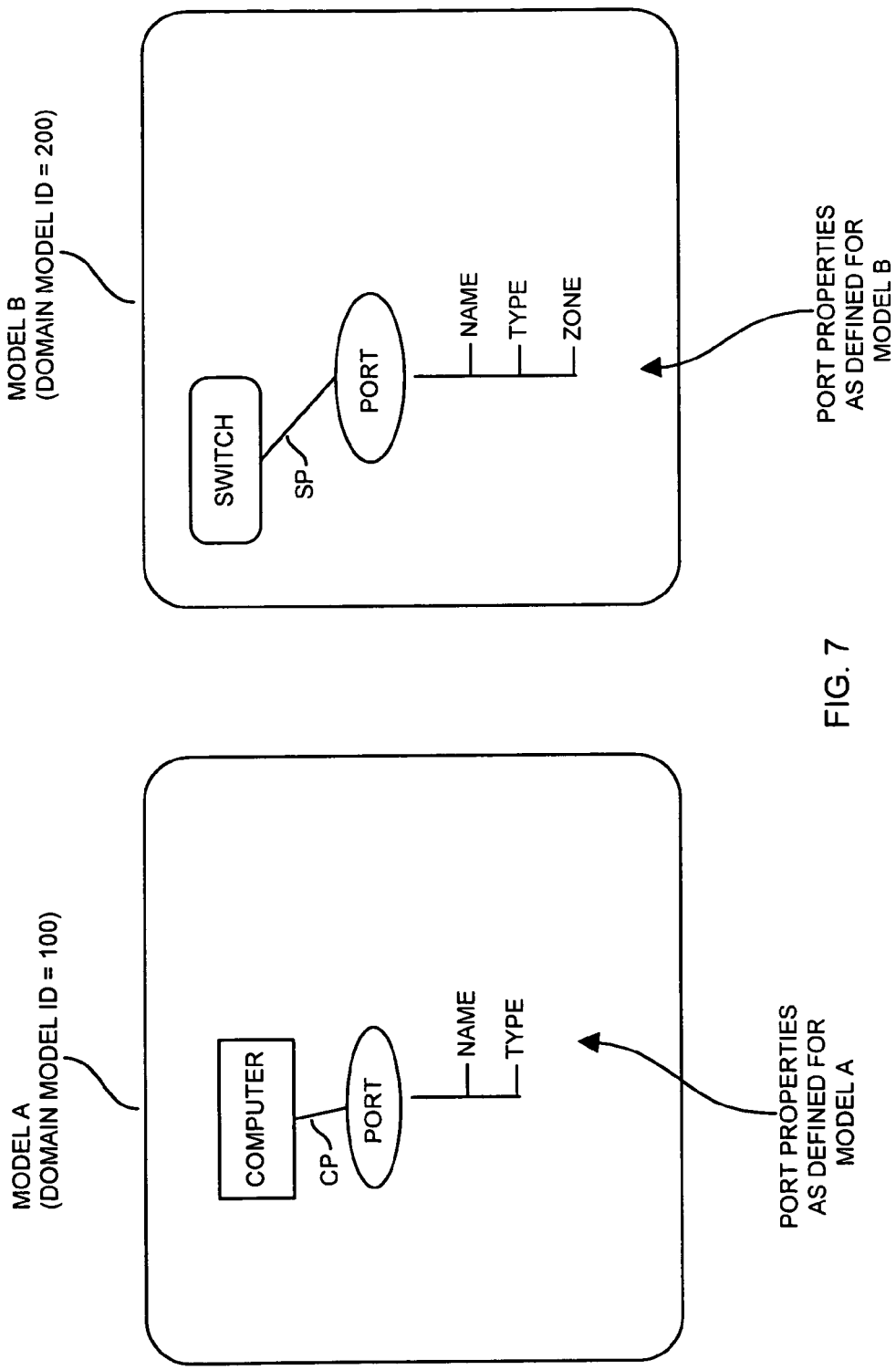
FIG. 7 is a diagram illustrating two different models for storing information associated with storage area network resources according to embodiments herein.

Data search operations within a topology service can be defined using domain model definitions (nodes such as storage area network resources and corresponding links). FIG. 7 is a diagram illustrating an example of multiple different models for storing information in repository 180 according to embodiments herein. As previously discussed, different topology viewing applications can retrieve data for the models and produce the topology views as in FIG. 8 in accordance with the models.

Figure 8:
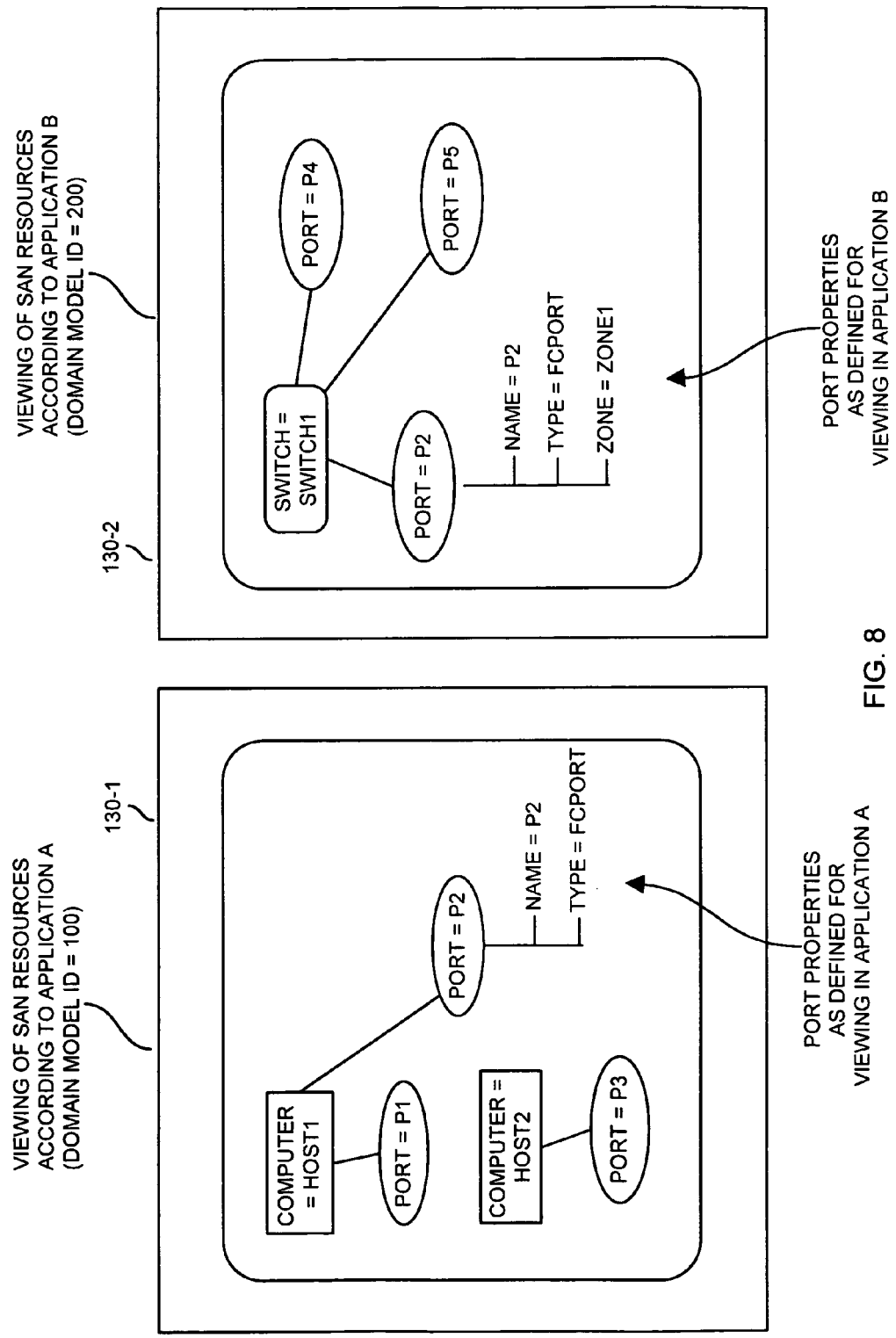
FIG. 8 is a diagram illustrating two different views of storage area network resources according to two different viewing applications according to embodiments herein.

FIG. 8 is a diagram illustrating another example of storage area network resource that can be viewed by different applications such as application A and application B. Assume for this example that the database schema 182 in repository 180 stores the appropriate information reflecting these views as discussed above for the previous examples.

Assume in this example that application Model A states that object of the type Computer connected with object of the type Port using relationship object CP (e.g., Computer-Port). To define data search request to retrieve all ports connected to computer Application A can have a corresponding model-based construction such as shown in FIG. 7 such as:

Computer->CP->Port

So, using it own corresponding model definitions, application A can formalize any topology operation which needs to be done. This topology service can understand the format and executes traversal request with respect to this model and corresponding data.

After defining a traversal request, application A can execute that request using various instances of the object computer by specifying details.

To find all connected ports to computer HOST1:

Computer(name=Host1)->CP->Port

To find all connected ports to computer with specific IP address:

Computer(IP=154.23.65.78)->CP->Port

To find all nearby by firewall ports for computer HOST1:

Computer(name=Host1)->CP->Port(firewall-=yes)

IP, name, firewall are attributes of the computer and port objects within Application Model A.

The scope of these operations was Application Model A.

Let's assume that application A knows about existence of application model B which includes Switch objects, Port objects and their relationships SP. Application A can define it's scope as A,B and execute following request:

Computer(name=Host1)->CP->Port->SP->Switch

And retrieve all switches connected to computer Host1 even if information about switches and their connectivity to ports was discovered and belongs to another domain model and another application.

The following is an example of how these requests are executed by a topology service:

Computer(name=Host1)->CP->Port

Topology service executes a following sequence of operations:

Retrieve all instances of the node type computer which have name=Host1 and instantiated in namespace A by querying NODE table. Results are saved into temporary table as an object instances database IDs.

Retrieve all database objects instances IDs using CP link instances from namespace A which have starting object instance database ID same as any from saved result of execution of the previous step. As soon as every link instance is the pair or database object instance IDs (ID1 start and ID2 end) and link type defines that if ID1 belongs to object of the computer type, then ID2 always belongs to object of the port type, all retrieved ID2 will identify correct instances of the port object. All ID2 are saved into the same temporary table as results of the previous step. To execute this step topology service querying LINK table.

Return list of port objects to application using database objects IDs saved as result of step 2.

Computer(name=Host1)->CP->Port->SP->Switch

Steps for a "port" are executed in a similar way as described in previous example. When all ports connected to computer Host1 are found and saved into temporary table as object Ids, proceed with the following steps:

Next, execution step link definition belongs to namespace of the application model B. For given example topology service will perform implicit conversion of the port objects from domain model A to port objects of the domain model B. Currently topology service using object instance names to identify similar object instances in both models. Future releases may allow defining of individual conversion rules for specific domain models and specific object types. Topology service retrieve all instances of the object type port which were instantiated within namespace B and has same names as port objects retrieved on the previous execution step from namespace A. Results are saved into same temporary table. The topology service queries the NODE table (e.g., respective type table) to perform that operation.

Retrieve all database objects instances IDs using SP link instances from namespace B which have object instance ID same as any from saved result of execution of the previous step.

Return list of switch objects to application using database objects IDs saved as result previous step.

Figure 9:
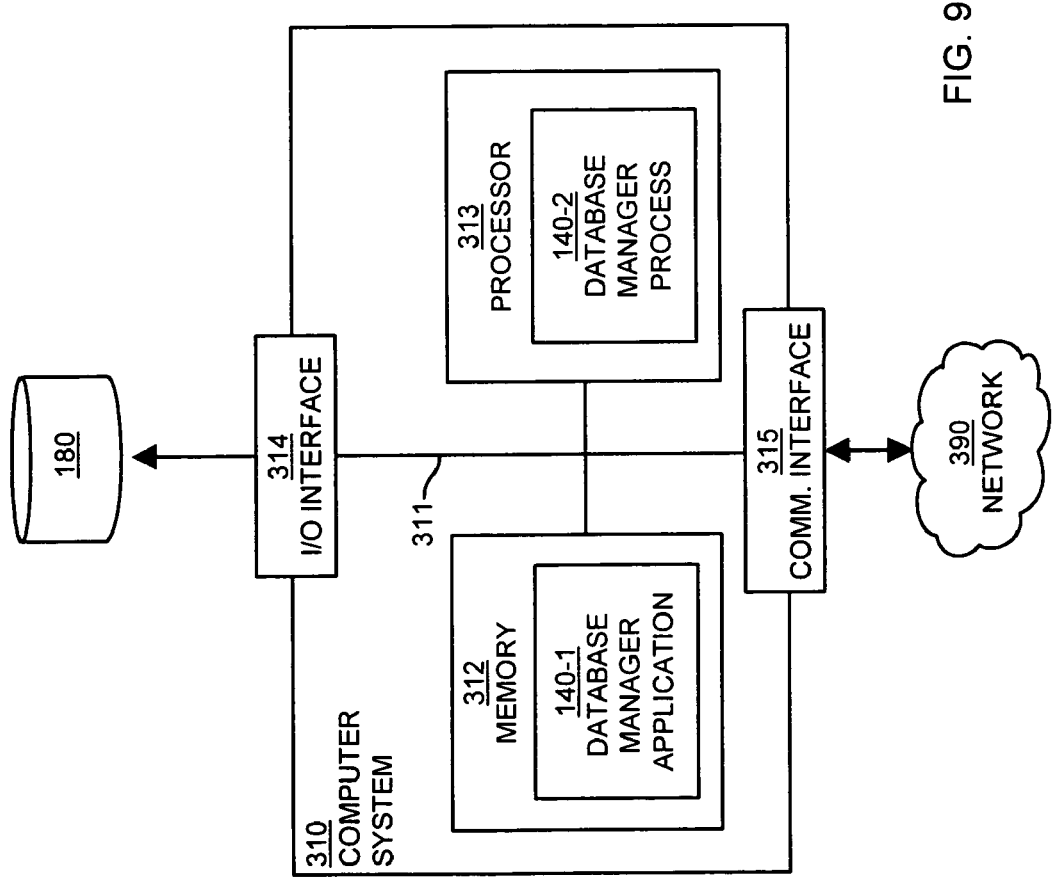
FIG. 9 is a diagram of a sample architecture for carrying out different processes according to embodiments herein.

FIG. 9 is a block diagram illustrating an example computer system 310 for executing database manager 140 and other processes according to embodiments herein. Computer system 310 may be a computerized device such as a personal computer, workstation, portable computing device, console, network terminal, processing device, etc.

As shown, computer system 310 of the present example includes an interconnect 311 that couples a memory system 312, a processor 313, an I/O interface 314, and a communications interface 315. Computer system 310 accesses repository 180 through I/O interface 314. Communications interface 315 of computer system 310 enables computer system 310 to communicate over network 390 to transmit and receive information from different resources.

As shown, memory system 312 is encoded with database manager application 140-1 supporting use and maintenance of repository 180 as discussed herein. Database manager application 140-1 can be embodied as software code such as data and/or logic instructions (e.g., code stored in the memory or on another computer readable medium such as a disk) that support functionality according to different embodiments described herein.

During operation of database manager application 140-1, processor 313 accesses memory system 312 via the interconnect 311 in order to launch, run, execute, interpret or otherwise perform the logic instructions of the database manager application 140-1. Execution of database manager application 140-1 produces processing functionality in database manager process 140-2. In other words, the database manager process 140-2 represents one or more portions of the database manager application 140-1 (or the entire application) performing within or upon the processor 313 in the computer system 310.

It should be noted that database manager 140 (also in FIG. 1) executed in computer system 310 can be represented by either one or both of the database manager application 140-1 and/or the database manager process 140-2. For purposes of this discussion and different embodiments herein, general reference will again be made to the database manager 140 as performing or supporting the various steps and functional operations as previously discussed and as will be discussed further in this specification.

It should be noted that, in addition to the database manager process 140-2, embodiments herein include the database manager application 140-1 itself (i.e., the un-executed or non-performing logic instructions and/or data). The database manager application 140-1 may be stored on a computer readable medium such as a floppy disk, hard disk, or optical medium. The database manager application 140-1 may also be stored in a memory type system such as in firmware, read only memory (ROM), or, as in this example, as executable code within the memory system 312 (e.g., within Random Access Memory or RAM). In addition to these embodiments, it should also be noted that other embodiments herein include the execution of database manager application 140-1 in processor 313 as the database manager process 140-2. Thus, those skilled in the art will understand that the computer system 310 may include other processes and/or software and hardware components, such as an operating system that controls allocation and use of hardware resources.

Functionality supported by database manager 140 will now be discussed via flowcharts in FIG. 10-12.

Figure 10:
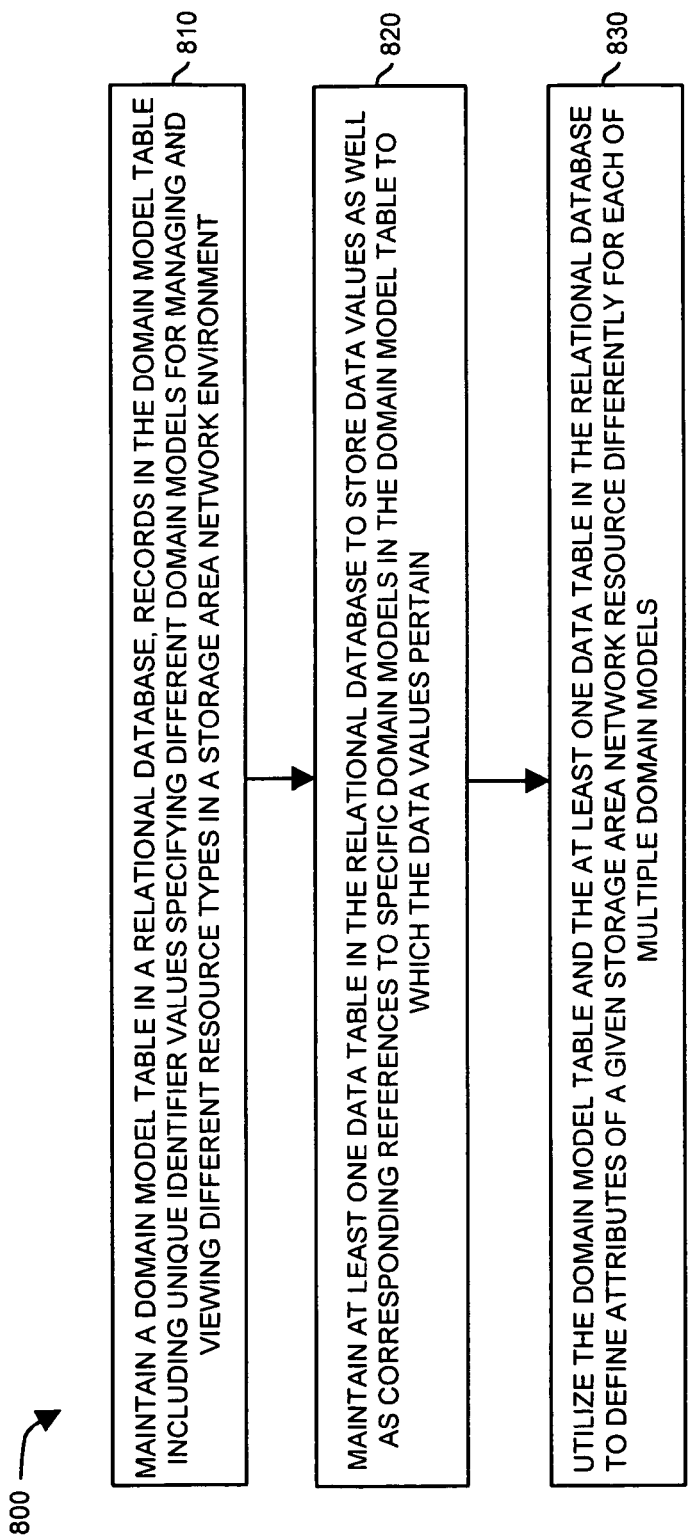
FIG. 10 is a flowchart illustrating utilization of a database schema to store information associated with each of multiple different types of resources present in a storage area network environment according to embodiments herein.

Now, more particularly, FIG. 10 is a flowchart 800 illustrating a technique of maintaining information associated with a respective storage area network environment according to an embodiment herein. Note that techniques discussed in flowchart 800 overlap with and/or summarize the techniques discussed above.

In step 810, the database manager 140 maintains a domain model table 205 in a relational database of repository 180. The records in the domain model table 205 include unique identifier values specifying different domain models for managing and viewing different resource types in a storage area network environment 100.

In step 820, the database manager 140 maintains at least one data value table 240 in the relational database to store data values as well as corresponding references to specific domain models in the domain model table 205 to which the data values pertain.

In step 830, the database manager 140 utilizes the domain model table 205 and the at least one data table 240 in the relational database to define attributes of a given storage area network resource differently for each of multiple domain models.

Figure 11:
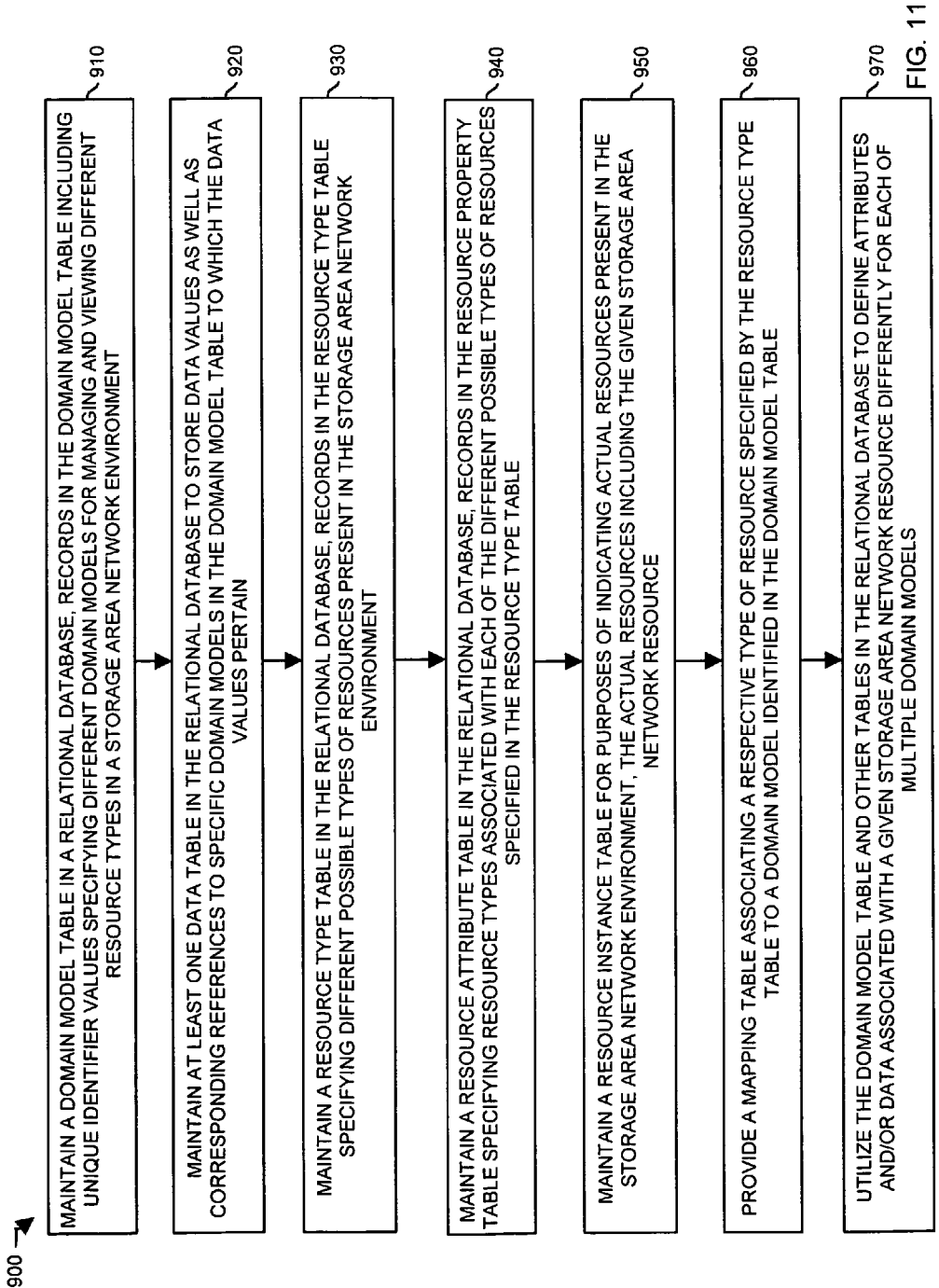
FIG. 11 is a flowchart illustrating techniques of maintaining a database according to embodiments herein.

FIG. 11 is a flowchart 900 illustrating a technique of maintaining information associated with a respective storage area network environment according to an embodiment herein. Note that techniques discussed in flowchart 900 overlap with and/or summarize the techniques discussed above.

In step 910, the database manager 140 maintains a domain model table 205 in a relational database. Records in the domain model table 205 include unique identifier values specifying different domain models for managing and viewing different resource types in a storage area network environment 100.

In step 920, the database manager 140 maintains at least one data table in the relational database to store data values as well as corresponding references to specific domain models in the domain model table 205 to which the data values pertain.

In step 930, the database manager 140 maintains a resource type table 210 in the relational database. Records in the resource type table 210 specify different possible types of resources present in the storage area network environment 100.

In step 940, the database manager 140 maintains a resource attribute table 220 in the relational database. Records in the resource property table specify resource types associated with each of the different possible types of resources specified in the resource type table 220.

In step 950, the database manager 140 maintains a resource instance table 230 for purposes of indicating actual resources present in the storage area network environment 100.

In step 960, the database manager 140 provides a domain to resource mapping table 250 associating a respective type of resource specified in the resource type table 210 to a domain model identified in the domain model table 205.

In step 970, the database manager 140 utilizes the domain model table 205 and other tables in the relational database to define attributes and/or data associated with a given storage area network resource differently for each of multiple domain models.

Figure 12:
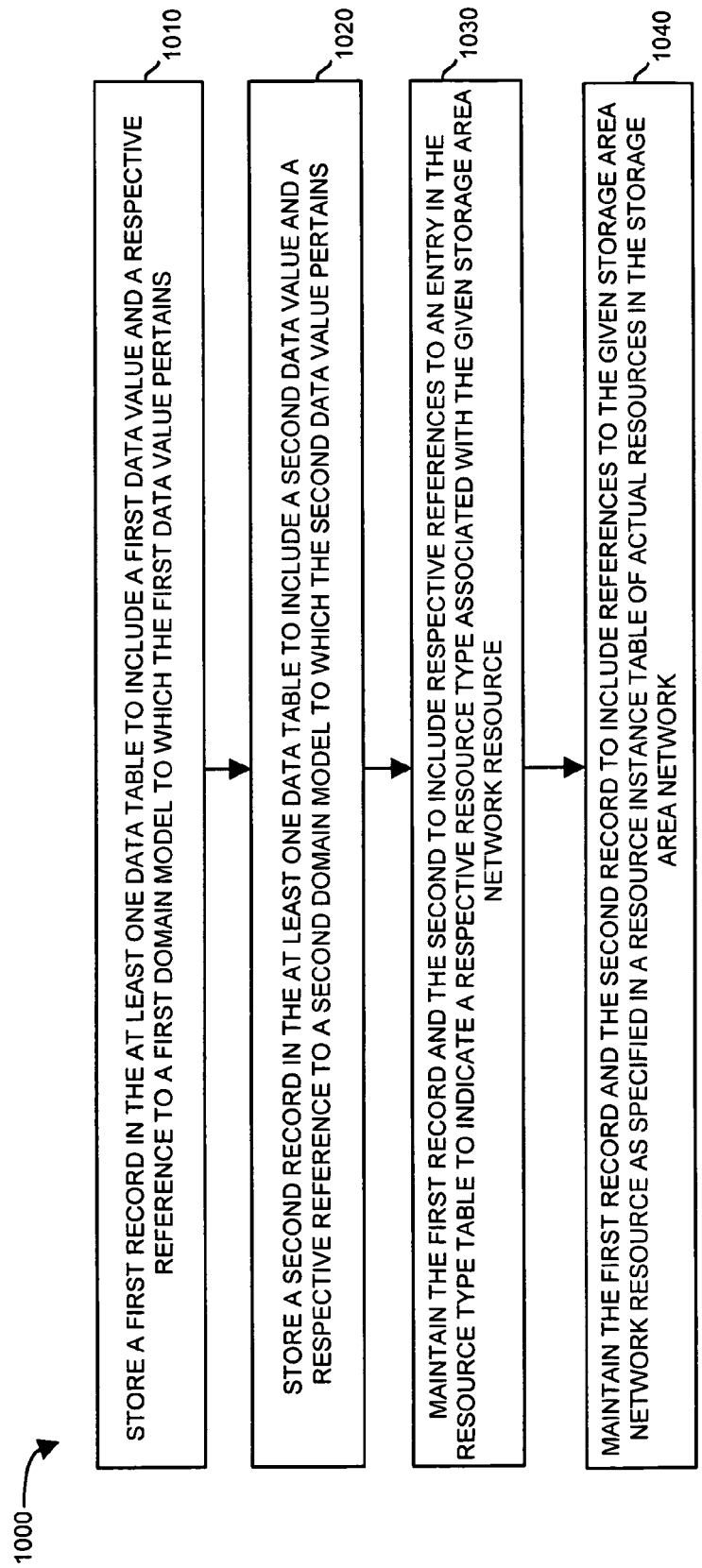
FIG. 12 is a flowchart illustrating techniques of maintaining a database according to embodiments herein.

FIG. 12 is a flowchart 1000 illustrating a technique of maintaining information associated with a respective storage area network environment according to an embodiment herein. Note that techniques discussed in flowchart 1000 overlap with and/or summarize the techniques discussed above.

In step 1010, for a given storage area network resource, the database manager 140 stores a first record in the data value tables 240 to include a first data value and a respective reference to a first domain model to which the first data value pertains.

In step 1020, the database manager 140 stores a second record in the data value tables 240 to include a second data value and a respective reference to a second domain model to which the second data value pertains.

In step 1030, the database manager 140 maintains the first record and the second record to include respective references to a record in the resource type table 210 to indicate a respective resource type associated with the given storage area network resource.

In step 1040, the database manager 140 maintains the first record and the second record to include references to the given storage area network resource as specified in a resource instance table of actual resources in the storage area network.

As discussed above, techniques herein are well suited for use in environments supporting notification of changes to objects or object hierarchies having respective object data stored in a relational database. One such application for applying these techniques is a storage area network environment. However, it should be noted that embodiments herein are not limited to use in such applications.

While this invention has been particularly shown and described with references to preferred embodiments thereof, it will be understood by those skilled in the art that various changes in form and details may be made therein without departing from the spirit and scope of the present application as defined by the appended claims. Such variations are covered by the scope of this present application. As such, the foregoing description of embodiments of the present application is not intended to be limiting. Rather, any limitations to the invention are presented in the following claims.

We claim:

1. A computer-implemented method in which at least one computer system executes software instructions retrieved from computer storage, the computer-implemented method comprising:

maintaining a domain model table in a relational database, records in the domain model table including unique identifier values specifying different domain models for managing and viewing different resource types in a storage area network environment;

maintaining at least one data table in the relational database to store data values as well as corresponding references to specific domain models in the domain model table to which the data values pertain; and utilizing the domain model table and the at least one data table in the relational database to define attributes of a given storage area network resource differently for each of multiple domain models;

maintaining a resource type table in the relational database records in the resource type table specifying different possible types of resources present in the storage area network environment:

maintaining a resource attribute table in the relational database records in the resource property table specifying resource types associated with each of the different possible types of resources specified in the resource;

maintaining a resource instance table for purposes of indicating actual resources present in the storage area network environment, the actual resources including the common resource:

in addition to storing data values as well as corresponding references to specific domain models in the domain model table to which the data values pertain, storing a respective set of identifier values for each of multiple data values in the at least one data table: and for a particular data value in the at least one data table, the respective set of identifies including:

i) a first identifier value specifying a resource type in the resource type table for which the particular data value pertains, ii) a second identifier value specifying a resource attribute type in the resource property table to which the particular data value pertains and iii) a third identifier value specifying an actual resource present in the storage area network environment to which the particular data value pertains.

2. A computer-implemented method as in claim 1, wherein utilizing the domain model table and the at least one data table includes:

i) for the given storage area network resource, storing a first record in the at least one data table to include a first data value and a respective reference to a first domain model to which the first data value pertains; and ii) for the given storage area network resource, storing a second record in the at least one data table to include a second data value and a respective reference to a second domain model to which the second data value pertains.

3. A computer-implemented method as in claim 2 further comprising: storing the resource type table in the relational database.

4. A computer-implemented method as in claim 1 further comprising:

enabling a first management application to use a first portion of the data values in the at least one data table to view the given storage area network resource according to a first domain model; and enabling a second management application to use a second portion of the data values in the at least one data table to view the given storage area network resource according to a second domain model, the second domain model supporting a different viewing of the given storage area network resource than as supported by the first domain model.

5. A computer-implemented method as in claim 1 further comprising:

for an application that provides simultaneous viewing of information associated with multiple domain models, applying a set of merging rules to consolidate redundant information associated with the given resource maintained for each of the multiple domain models.

6. A computer-implemented method as in claim 1 further comprising: providing a mapping table associating each domain model identified in the domain model table to a respective type of resource specified by the resource type table.

7. A computer system comprising:

a processor;

a memory unit that stores instructions associated with an application executed by the processor; and an interconnect coupling the processor and the memory unit, enabling the computer system to execute the application and perform operations of:

maintaining a domain model table in a relational database, records in the domain model table including unique identifier values specifying different domain models for managing and viewing different resource types in a storage area network environment;

maintaining at least one data table in the relational database to store data values as well as corresponding references to specific domain models in the domain model table to which the data values pertain;

utilizing the domain model table and the at least one data table in the relational database to define attributes of a given storage area network resource differently for each of multiple domain models;

maintaining a resource type table in the relational database records in the resource type table specifying different possible types of resources present in the storage area network environment:

maintaining a resource attribute table in the relational database records in the resource property table specifying resource types associated with each of the different possible types of resources specified in the resource;

maintaining a resource instance table for purposes of indicating actual resources present in the storage area network environment, the actual resources including the common resource:

in addition to storing data values as well as corresponding references to specific domain models in the domain model table to which the data values pertain, storing a respective set of identifier values for each of multiple data values in the at least one data table: and for a particular data value in the at least one data table, the respective set of identifies including:
  i) a first identifier value specifying a resource type in the resource type table for which the particular data value pertains,
  ii) a second identifier value specifying a resource attribute type in the resource property table to which the particular data value pertains and
  iii) a third identifier value specifying an actual resource present in the storage area network environment to which the particular data value pertains.

8. A computer system as in claim 7, wherein utilizing the domain model table and the at least one data table includes:
  i) for the given storage area network resource, storing a first record in the at least one data table to include a first data value and a respective reference to a first domain model to which the first data value pertains; and
  ii) for the given storage area network resource, storing a second record in the at least one data table to include a second data value and a respective reference to a second domain model to which the second data value pertains; and maintaining a resource type table in the relational database, records in the resource type table specifying different possible types of resources present in the storage area network environment; and maintaining the first record and the second to include respective references to an entry in the resource type table to indicate a respective resource type associated with the given storage area network resource.

9. A computer system as in claim 7 further supporting operations of:
  enabling a first management application to use a first portion of the data values in the at least one data table to display the given storage area network resource according to a first domain model; and
  enabling a second management application to use a second portion of the data values in the at least one data table to display the given storage area network resource according to a second domain model, the second domain model supporting a different perspective of the given storage area network resource than as supported by the first domain model.

10. A computer program product including a computer-readable storage medium having instructions stored thereon for processing data information, such that the instructions, when carried out by a processing device, enable the processing device to perform the steps of:
  maintaining a domain model table in a relational database, records in the domain model table including unique identifier values specifying different domain models for managing and viewing different resource types in a storage area network environment;
  maintaining at least one data table in the relational database to store data values as well as corresponding references to specific domain models in the domain model table to which the data values pertain; and utilizing the domain model table and the at least one data table in the relational database to define attributes of a given storage area network resource differently for each of multiple domain models;

maintaining a resource type table in the relational database records in the resource type table specifying different possible types of resources present in the storage area network environment:

maintaining a resource attribute table in the relational database records in the resource property table specifying resource types associated with each of the different possible types of resources specified in the resource;

maintaining a resource instance table for purposes of indicating actual resources present in the storage area network environment, the actual resources including the common resource:

in addition to storing data values as well as corresponding references to specific domain models in the domain model table to which the data values pertain, storing a respective set of identifier values for each of multiple data values in the at least one data table: and for a particular data value in the at least one data table, the respective set of identifies including:
  i) a first identifier value specifying a resource type in the resource type table for which the particular data value pertains,
  ii) a second identifier value specifying a resource attribute type in the resource property table to which the particular data value pertains and
  iii) a third identifier value specifying an actual resource present in the storage area network environment to which the particular data value pertains.

11. A computer-implemented method as in claim 1 further comprising:
  producing a first view of the given storage area network resource in accordance with a first domain model of the different domain models; and
  producing a second view of the given storage area network resource in accordance with a second domain model of the different domain models.

12. A computer-implemented method as in claim 11 further comprising:
  producing the at least one data table to include separate sets of unique data for viewing the given storage area network resource, a first set of the unique data stored in the at least one data table including data for producing the first view, a second set of the unique data stored in the at least one data table including data for producing the second view.

13. A computer-implemented method as in claim 1 further comprising:
  retrieving a first data value from the at least one data table based on an association of the first data value with a first domain model;
  based at least in part on use of the first data value, producing a first view of the given resource in accordance with the first domain model;
  retrieving a second data value from the at least one data table based on an association of the second data value with a second domain model;
  based at least in part on use of the second data value, producing a second view of the given resource in accordance with the second domain model.

14. A computer-implemented method as in claim 13 further comprising:

storing different property values for the given storage area network resource in the at least one data table depending on the different domain models to which the different property values pertain;

producing a first view to include a first set of properties associated with the given storage area network resource based on data values in the at least one data table that are associated with the first domain model; and producing a second view to include a second set of properties associated with the given storage area network based on data values in the at least one data table that are associated with the second domain model, the first set of properties being different than the second set of properties.

* * * * *